United States Patent [19]
Arita et al.

[11] Patent Number: 6,101,996
[45] Date of Patent: Aug. 15, 2000

[54] OIL FILTER FIXING STRUCTURE

[75] Inventors: Eriya Arita, Iruma-gun; Kunihiko Tsuchiya, Asaka; Katsuya Yamada, Ageo; Hideki Yamamura, Taku; Takeshi Matsunaga, Yokohama, all of Japan

[73] Assignees: Tennex Corporation, Tokyo; Nissan Motor Co., Ltd., Yokohama, both of Japan

[21] Appl. No.: 09/251,940

[22] Filed: Feb. 18, 1999

[30] Foreign Application Priority Data

Feb. 20, 1998 [JP] Japan .................................. 10-039170
Dec. 25, 1998 [JP] Japan .................................. 10-369857

[51] Int. Cl.$^7$ ....................................................... F01M 1/00
[52] U.S. Cl. .................................... 123/196 A; 123/196 R
[58] Field of Search ............................. 123/196 R, 196 A

[56] References Cited

U.S. PATENT DOCUMENTS

| | | | |
|---|---|---|---|
| 4,151,823 | 5/1979 | Grosse et al. ......................... | 123/196 A |
| 5,374,355 | 12/1994 | Habiger et al. ......................... | 210/440 |
| 5,431,588 | 7/1995 | Kucik ........................................ | 440/88 |
| 5,698,098 | 12/1997 | Ernst et al. .............................. | 210/248 |
| 5,888,384 | 3/1999 | Wiederhold et al. .................... | 210/130 |

FOREIGN PATENT DOCUMENTS

| | | |
|---|---|---|
| 681 094 | 11/1995 | European Pat. Off. . |
| 839 563 | 5/1998 | European Pat. Off. . |
| 861 682 | 9/1998 | European Pat. Off. . |
| 9-173716 | 7/1997 | Japan . |
| 2 309 397 | 7/1997 | United Kingdom . |

*Primary Examiner*—Marguerite McMahon
*Assistant Examiner*—Jason Benton
*Attorney, Agent, or Firm*—Foley & Lardner

[57] ABSTRACT

An oil filter unit comprising a housing (4) and a filter element (14) accommodated therein is fitted to an engine (1) via a bracket (3) having a cylindrical holder (5). The housing (4) is secured to the holder (5) by screwing a male screw (19) on its outer circumference to a female screw (17) formed in the inner circumference of the holder (5). A first cut-out (24) is formed across the female screw (17) and a second cut-out (23) is formed across the male screw (19). When these cut-outs (24, 23) meet together, they form a drain passage which drains the oil in the housing (4) to outside. With this construction, the oil in the housing is drained via a predetermined path and prevented from scattering around, when the filter unit is removed from the engine (1).

9 Claims, 9 Drawing Sheets

OIL FILTER FIXING STRUCTURE

FIELD OF THE INVENTION

This invention relates to a fixing structure of an oil filter to an internal combustion engine.

BACKGROUND OF THE INVENTION

A filter unit fitted to an internal combustion engine for filtering the lubrication oil generally comprises a filter housing and a filter element accommodated therein. The lubrication oil led into the housing from the engine is filtered by the filter element and returns to the inside of the engine.

Since the filter unit is filled with lubrication oil while in operation, the lubrication oil may flow out and scatter when the filter unit is removed from the engine for replacement.

In this context, Tokkai Hei 9-173716 published by the Japanese Patent Office in 1997, discloses to provide a drain plug at the bottom of the filter housing. When the filter unit is to be replaced, the drain plug is removed, thereby evacuating the filter unit, and then the empty filter unit is removed from the engine.

SUMMARY OF THE INVENTION

However, newly providing a drain plug increases both the manufacturing cost and size of the filter unit.

It is therefore an object of this invention to provide a drain to the filter unit without increasing the manufacturing cost and size.

In order to achieve the above object, this invention provides a fixing structure of an engine oil filter unit, comprising a bracket fixed to an engine, the bracket comprising a cylindrical part having an inner circumference, a female screw formed on the inner circumference and a first drain element formed in female screw, and a housing which accommodates a filter element and is to be filled with oil, the housing having a cylindrical wall with an outer circumference, a male screw formed on the outer circumference to be engaged with the female screw, and a second drain element being formed in the male screw. The first and second drain elements are arranged to form a drain passage which drains oil in the housing to the outside when the first drain element meets the second drain element according to the relative rotation of the cylindrical part and the housing.

The details as well as other features and advantages of this invention are set forth in the remainder of the specification and are shown in the accompanying drawings.

DESCRIPTION OF THE PREFERRED EMBODIMENTS

Figure 1:
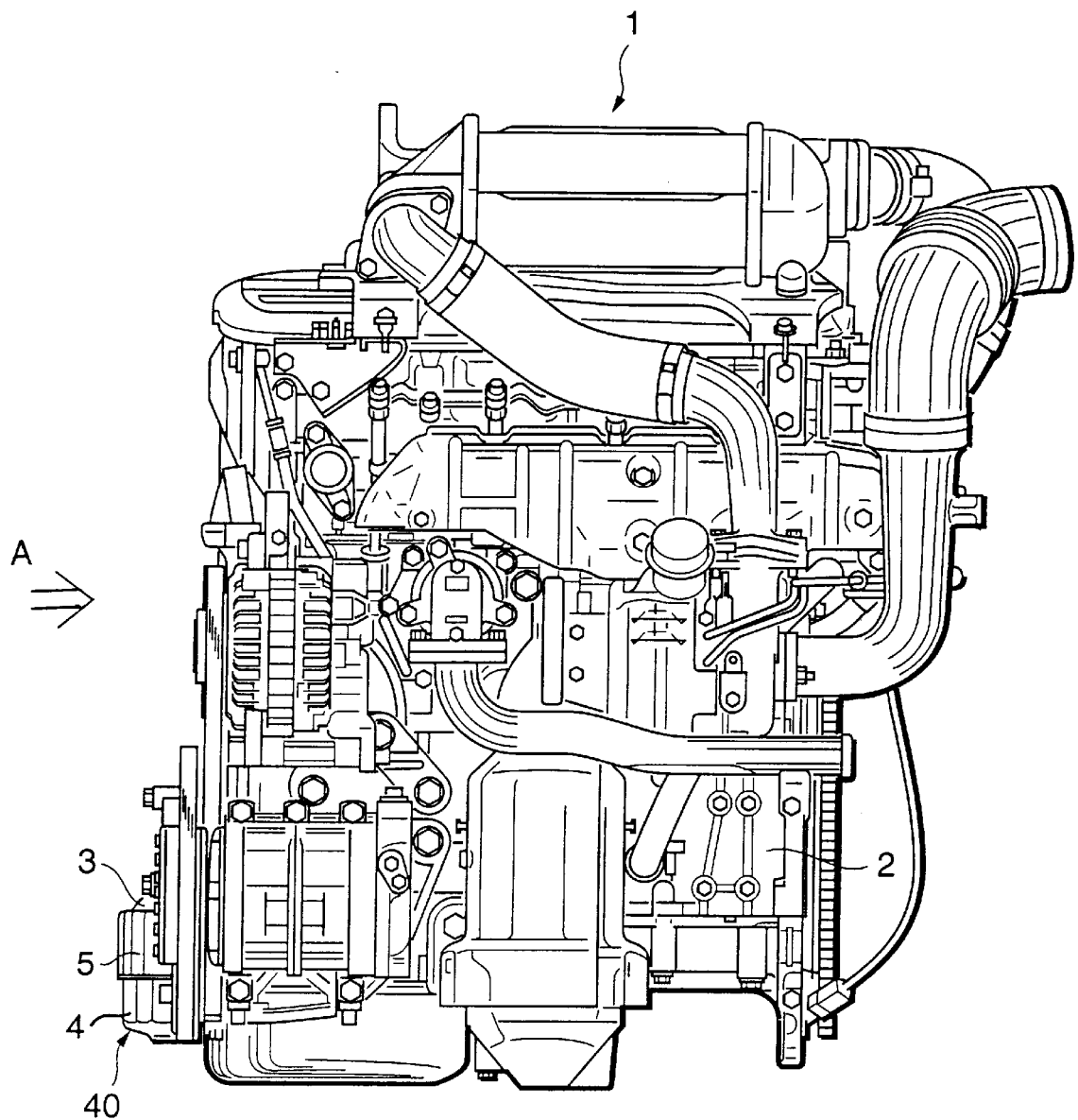
FIG. 1 is a front elevation of an engine equipped with a filter unit according to this invention.
Figure 2:
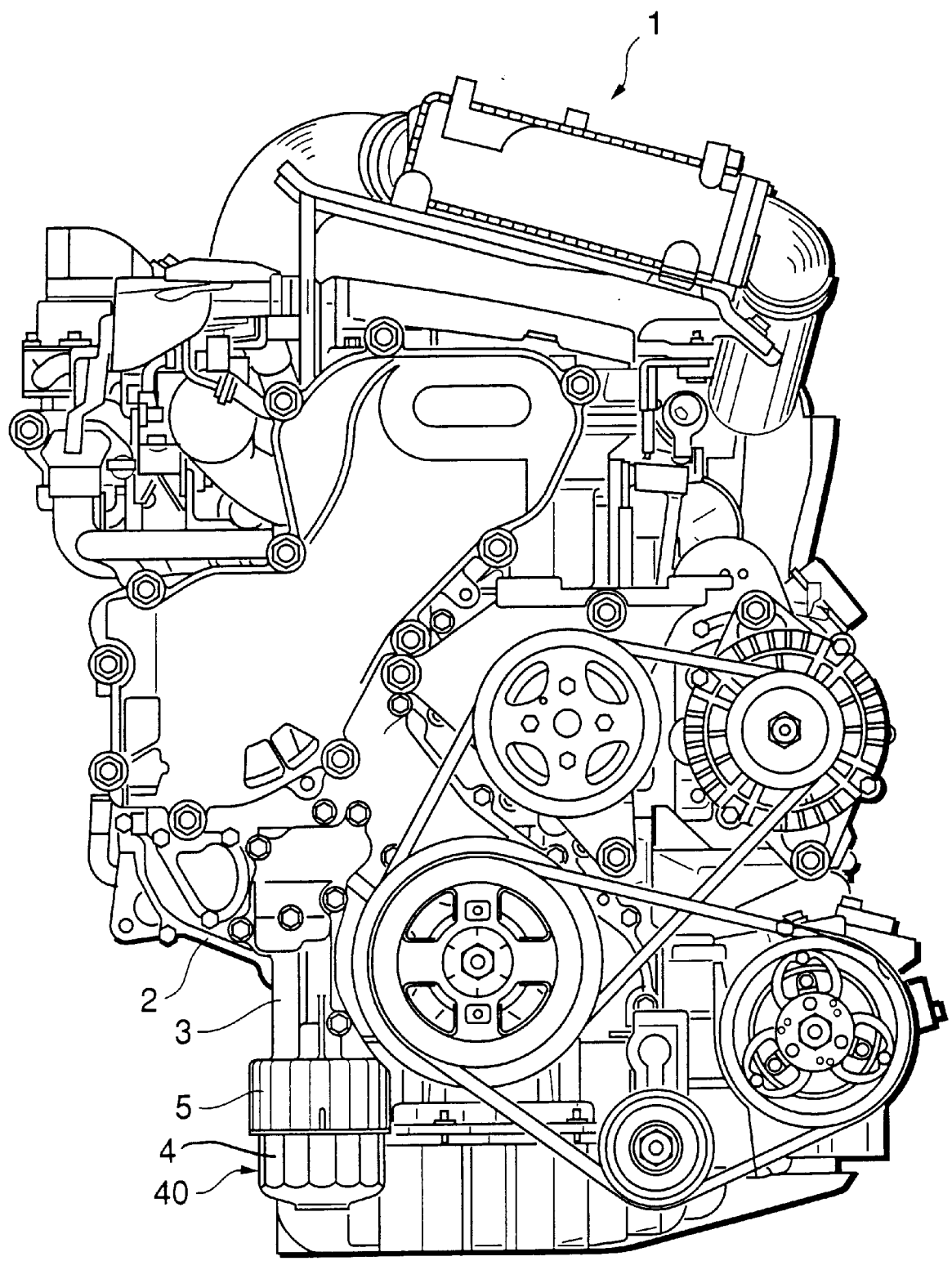
FIG. 2 is a side elevation of the engine viewed from the direction A of FIG. 1.
Figure 3:
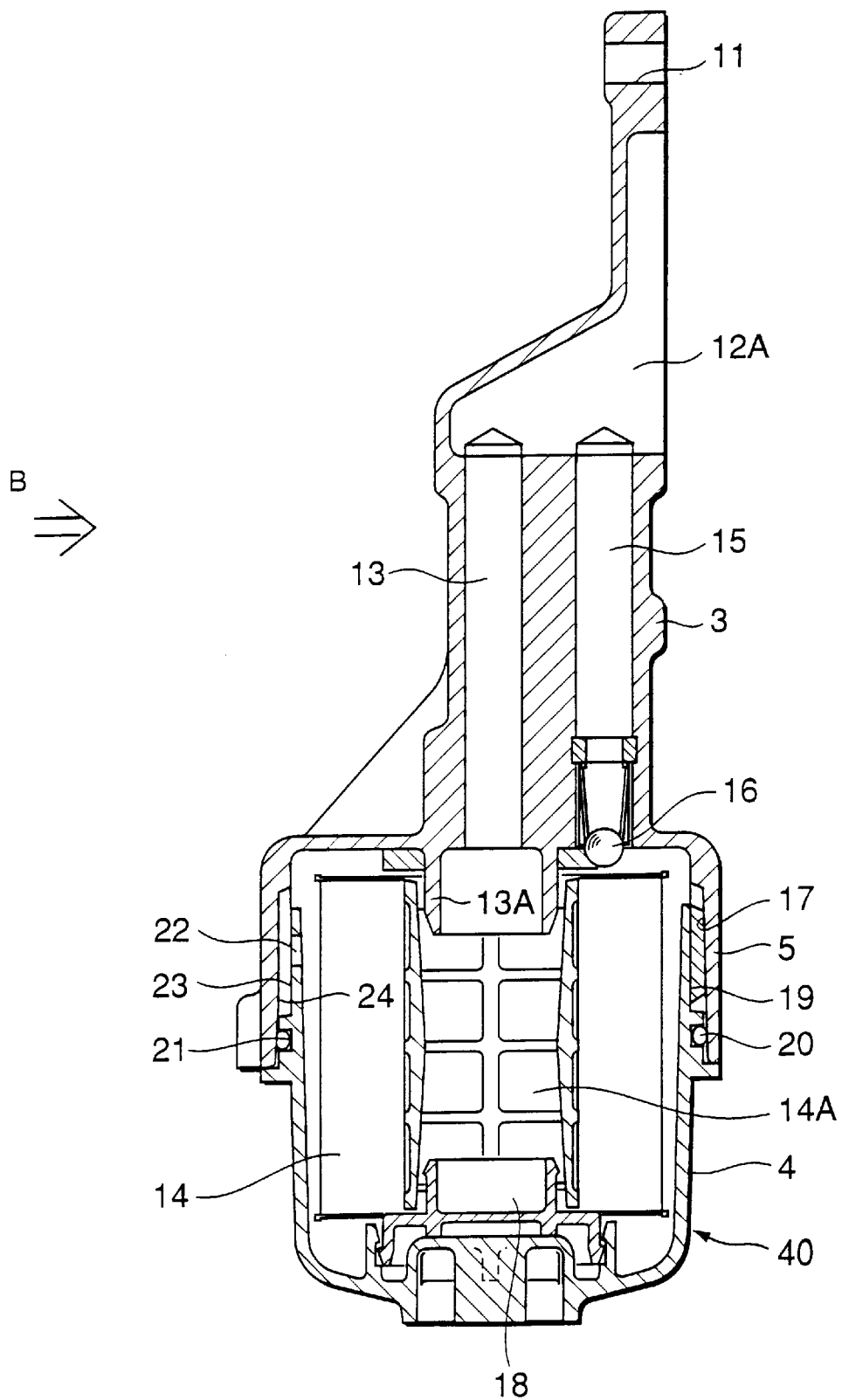
FIG. 3 is a vertical sectional view of the filter unit and a bracket according to this invention.

Referring to FIGS. 1, 2 and 3 of the drawings, a filter housing 4 of a filter unit 40 is fitted to a cylinder block 2 of a vehicle engine 1 via a bracket 3. The filter unit 40 comprises a filter housing 4 and a filter element 14 accommodated therein.

The bracket 3 comprises a cylindrical holder 5 at its lower end. The holder 5 has an opening downward and has a female screw 17 on its inner circumference.

The filter housing 4 has a male screw 19 on its outer circumference. When fitting the filter unit 40 to the holder 5, the upper part of the filter housing 4 is first inserted into the opening of the holder 5, then the housing 4 is turned so that the male screw 19 is engaged with the female screw 17.

A plurality of through holes 11 for passing bolts are formed at an upper part of the bracket 3. By screwing the bolts via these through holes into screw holes formed on the outer wall of the cylinder block 2, the bracket 3 is fixed to the cylinder block 2.

Figure 4:
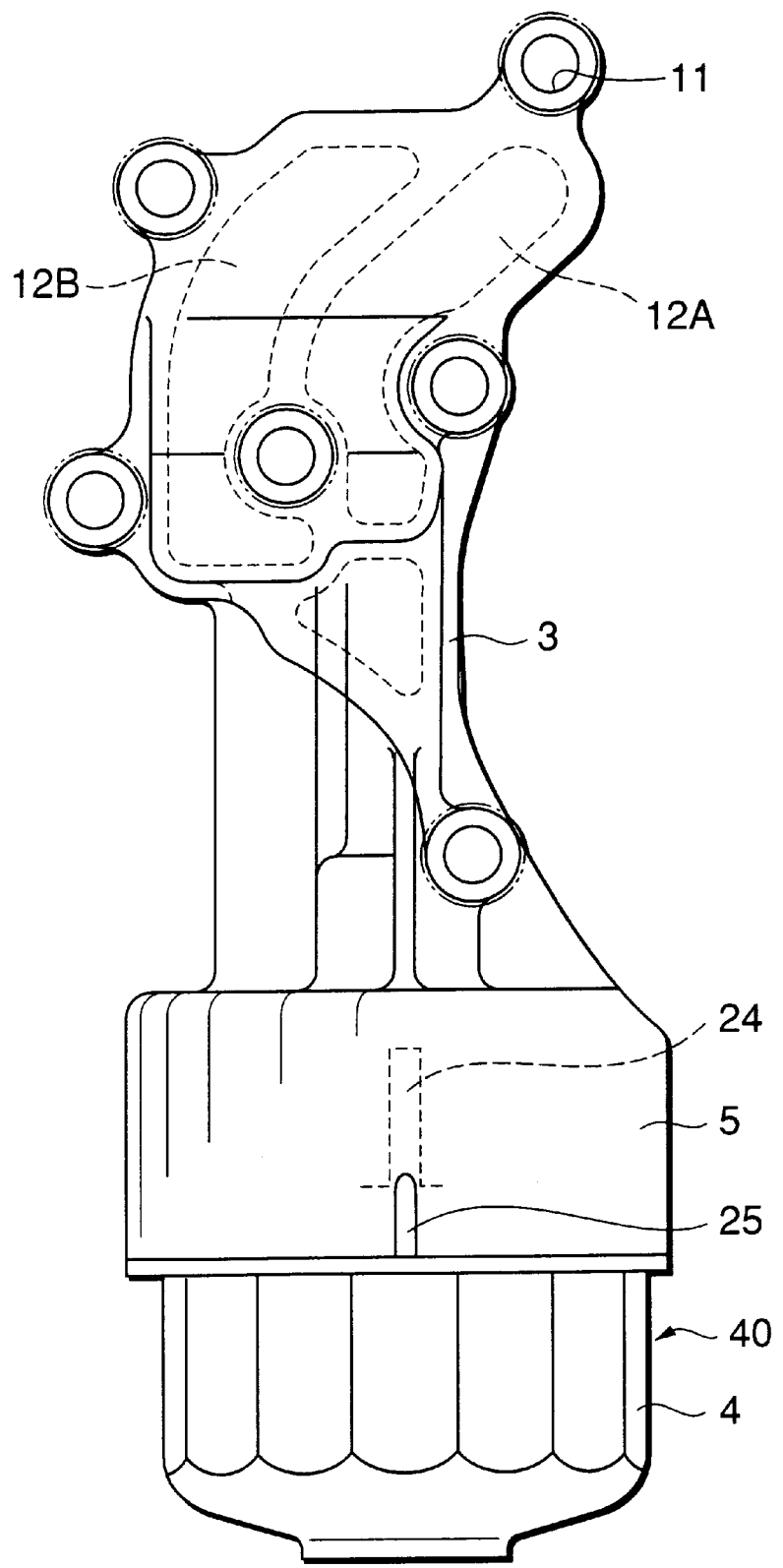
FIG. 4 is a side elevation of the filter unit and bracket viewed from the direction B of FIG. 3.

Two recesses 12A, 12B are formed in the bracket 3 as shown in FIG. 4. These recesses 12A, 12B are respectively facing the outer wall of the cylinder block 2 and connected separately to oil passages formed in the cylinder block 2. Oil passages 13 and 15 which open to the recess 12A are formed in the bracket 3.

The other end of the oil passage 13 opens to the inner space of the holder 5. When the filter housing 4 is fixed to the holder 5, the oil passage 13 communicates with a cylindrical hollow part 14A of the filter element 14.

The other end of the oil passage 15 also opens to the inner space of the holder 5. When the filter housing 4 is fixed to the holder 5, the oil passage 15 communicates with a space surrounding the filter element 14 in the housing 4. A relief valve 16 is disposed at this opening of the oil passage 15. The relief valve 16 opens according to a high pressure in the housing 4.

The space between the housing 4 and the filter element 14 is also communicated with the recess 12B via another oil passage, not shown, formed in the bracket 3.

Lubrication oil from the cylinder block 2 first flows into the recess 12B, then into the space between the filter element 14 and the housing 4 via the oil passage not shown, and permeates through the filter element 14 to the cylindrical hollow part 14A. The lubrication oil in the cylindrical hollow part 14A is therefore the oil purified by the filter element 14. The oil thus purified returns to the cylinder block 2 via the passage 13 and recess 12A in the bracket 3.

When the internal pressure of the housing 4 rises due for example to the clogging of the filter element 14, the relief valve 16 will open and the lubrication oil around the filter element 14 is returned to the cylinder block 2 via the passage 15 and recess 12A without filtering.

A boss 18 is formed on the bottom of the filter housing 4 towards the inside of the housing 4. A projection 13A at the end of the oil passage 13 is projecting from the upper end of the holder 5 towards the inner space of the holder 5.

When the filter housing 4 is fixed to the holder 5, the projection 13A penetrates into the cylindrical hollow part 14A of the filter element 14 from above while the boss 18 penetrates into the cylindrical hollow part 14A from below. The filter element 14 is thus positioned and the cylindrical hollow part 14A is separated from the other space in the filter housing 4.

A circular groove 21 is formed on the outer circumference of the upper part of the filter housing 4 below the male screw 19 as shown in FIG. 3. An O-ring 20 is fitted to the circular groove 21.

The O-ring 20, when the filter housing 4 is secured to the holder 5, tightly fits to the inner circumference of the holder 5 and prevents the lubrication oil from leaking through the engaging part of the hosing 4 and holder 5.

A vertical cut-out 24 is formed as a first cut-out across the female screw 17 of the holder 5.

A drain hole 22 which communicates with the inner space of the filter housing 4 opens on the outer circumference of the filter housing 4.

Figure 5:
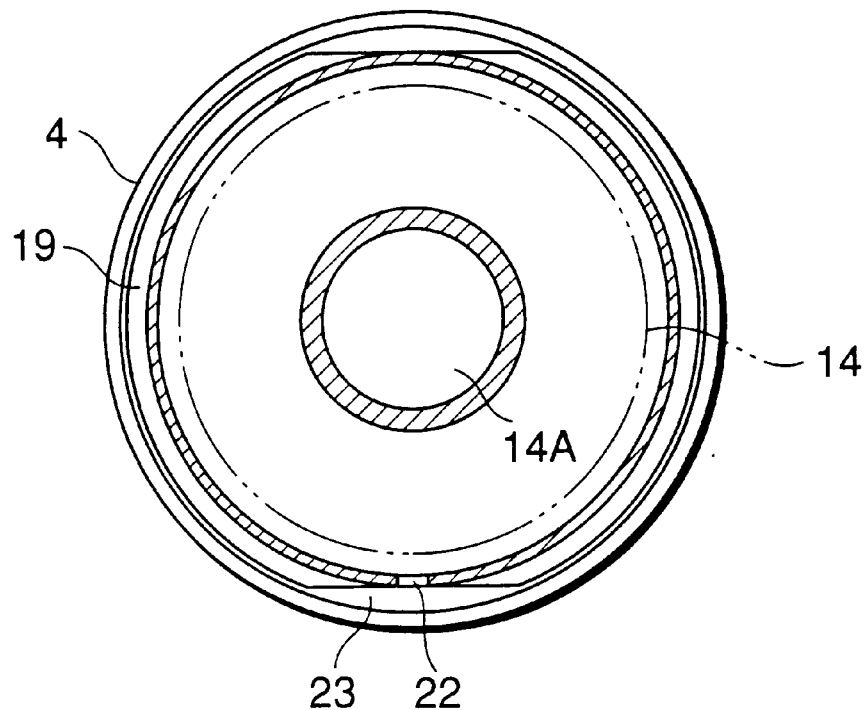
FIG. 5 is a horizontal sectional view of the filter unit.
Figure 6:
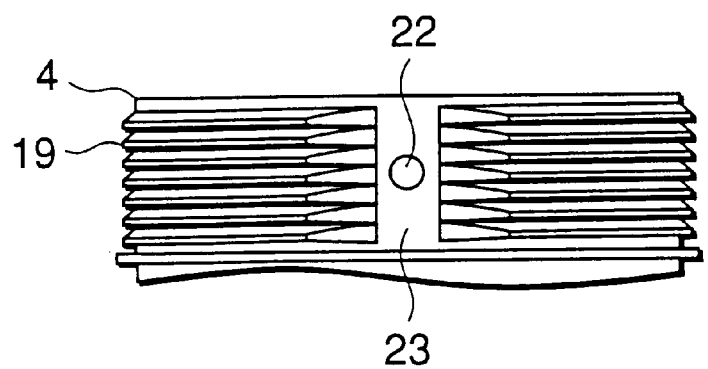
FIG. 6 is a side elevation of an upper part of the filter unit.

A vertical cut-out 23 is formed across the male screw 19 of the housing 4 as shown in FIGS. 5 and 6. The cut-out 23 is formed as a second cut-out around the opening of the drain hole 22.

The filter housing 4 is always filled with lubrication oil when it operates. When there is a necessity to replace the filter element 14, the filter housing 4 is rotated when the engine is not operating. After the housing 4 is detached from the holder 5, the filter element 14 in the housing 4 is replaced, and then the housing 4 is fitted again to the holder 5.

When turning the filter housing 4 for removal, it is first rotated until the O-ring 20 is detached from the inner circumference of the holder 5 and the second cut-out 23 faces the first cut-out 24.

Figure 7:
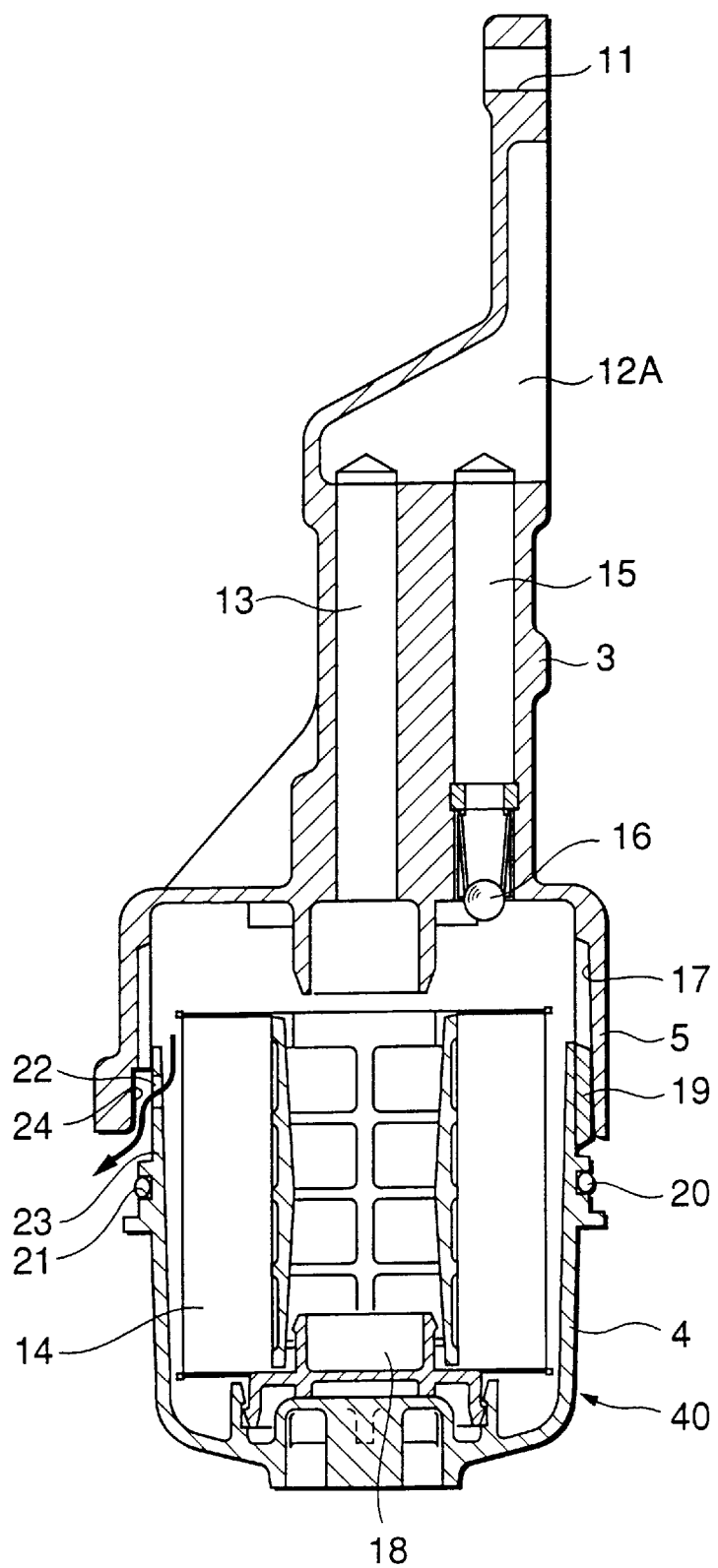
FIG. 7 is a vertical sectional view of the filter unit draining oil therefrom.

When this is accomplished as shown in FIG. 7, the oil in the housing is drained via the drain hole 22 and a vertical passage formed by the cut-outs 23, 24 which now face each other to the outside of the housing 4. The oil drained from the passage flows downwards along the outer circumference of the housing 4 and finally drops down from the lower end of the filter housing 4.

When the filter unit 40 is removed, therefore, a pan may be placed below the filter unit 40 to collect the oil drained from the filter housing 4. The drained oil is thereby collected without scattering around. As a result, neither workers nor the workshop will be soiled.

When the oil above the drain hole 22 is thus drained, the filter unit 40 is further rotated and removed from the holder 5. Since the oil level in the housing 4 is lower than the level of the drain hole 22, the removal of the filter unit 40 does not cause the overflow of the lubrication oil and does not contaminate the workers nor the workshop.

Since the above drain structure does not require a drain plug or the like as in the aforesaid prior art Tokkai Hei 9-173716, it is materialized with little increase in the manufacturing cost of the filter housing 4 and the holder 5.

In order to prevent the drained oil from adhering to the cylinder block 2, it is preferable that the first cut-out 24 is formed on the opposite side on the inner circumference of the holder 5 with respect to the cylinder block 2.

Figure 8:
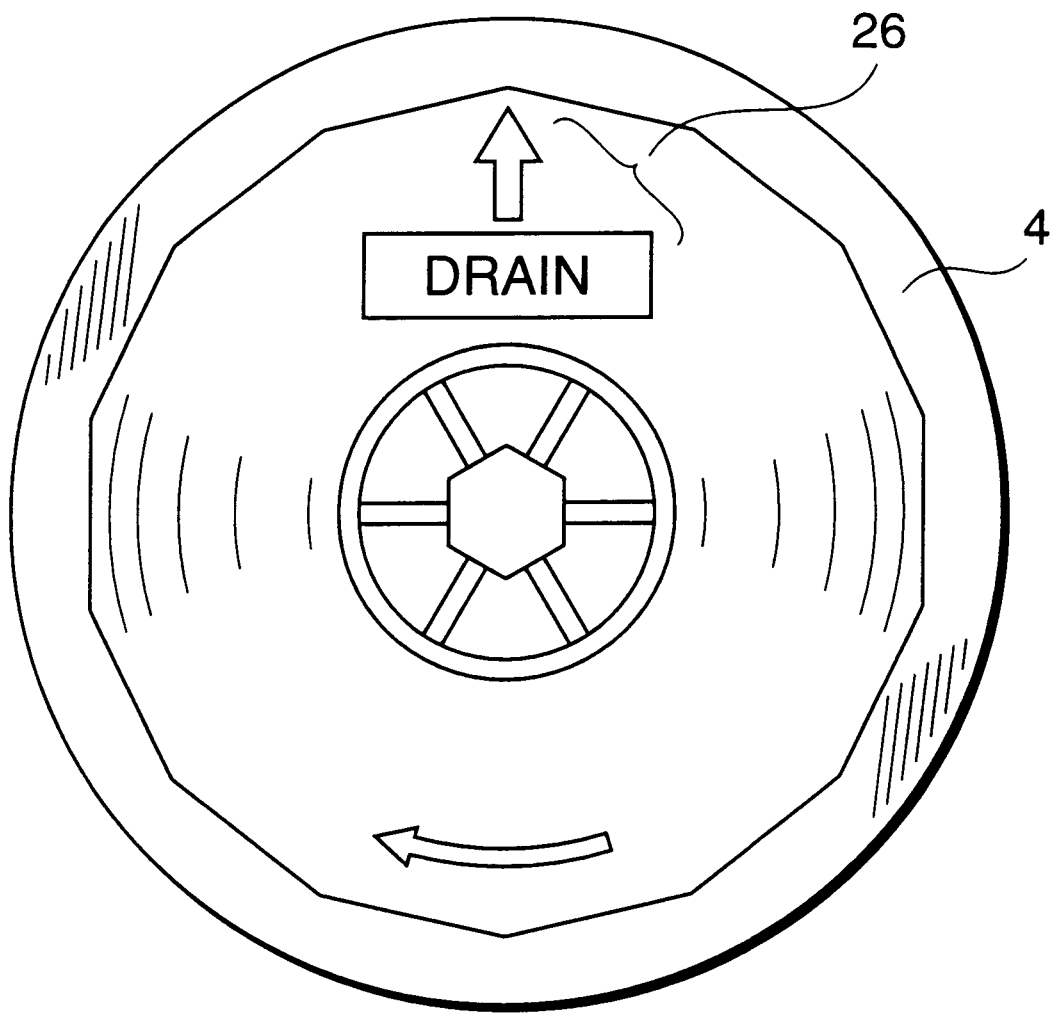
FIG. 8 is an under view of a filter housing according to this invention.

In order to facilitate the identification of the rotation position of the housing 4 wherein the first and second cut-out 24, 23 meet together, it is preferable to make marks 25, 26 on the holder 5 and the housing 4 as shown in FIGS. 4 and 8.

As shown in FIG. 4, the mark 25 is made on the outer circumference of the holder 5 in the form of a vertical rib in a position corresponding to the first cut-out 24.

The position of the mark 26 on the bottom surface of the housing 4 is then determined such that the mark 26 vertically overlaps with the mark 25 when the second cut-out 23 meets the first cut-out 24. The mark 26 is printed in the determined position on the bottom surface of the housing 4.

With such an arrangement, it becomes easy to set the first and second cut-outs 24, 23 to meet together. The mark 25 also specifies the flow out position of the drained oil, the setting of the collecting pan is also facilitated.

In this embodiment, the filter unit 40 and the holder 5 are arranged vertically. This invention is, however, applicable to the case where they are arranged horizontally. In this case, the cut-out 24 is preferably formed in the lowest position of the holder 5.

Also in this embodiment, the filter unit 40 is secured to the cylinder block 2 via the bracket 3, but such an arrangement also enables that the holder 5 to be provided in a one piece construction with the cylinder block 2 or an oil pan to be fitted to the bottom of the cylinder block 2.

It is also possible to provide the mark to specify the drain position of the oil independently of the marks to specify the meeting position of the cut-outs 23, 24.

Figure 9:
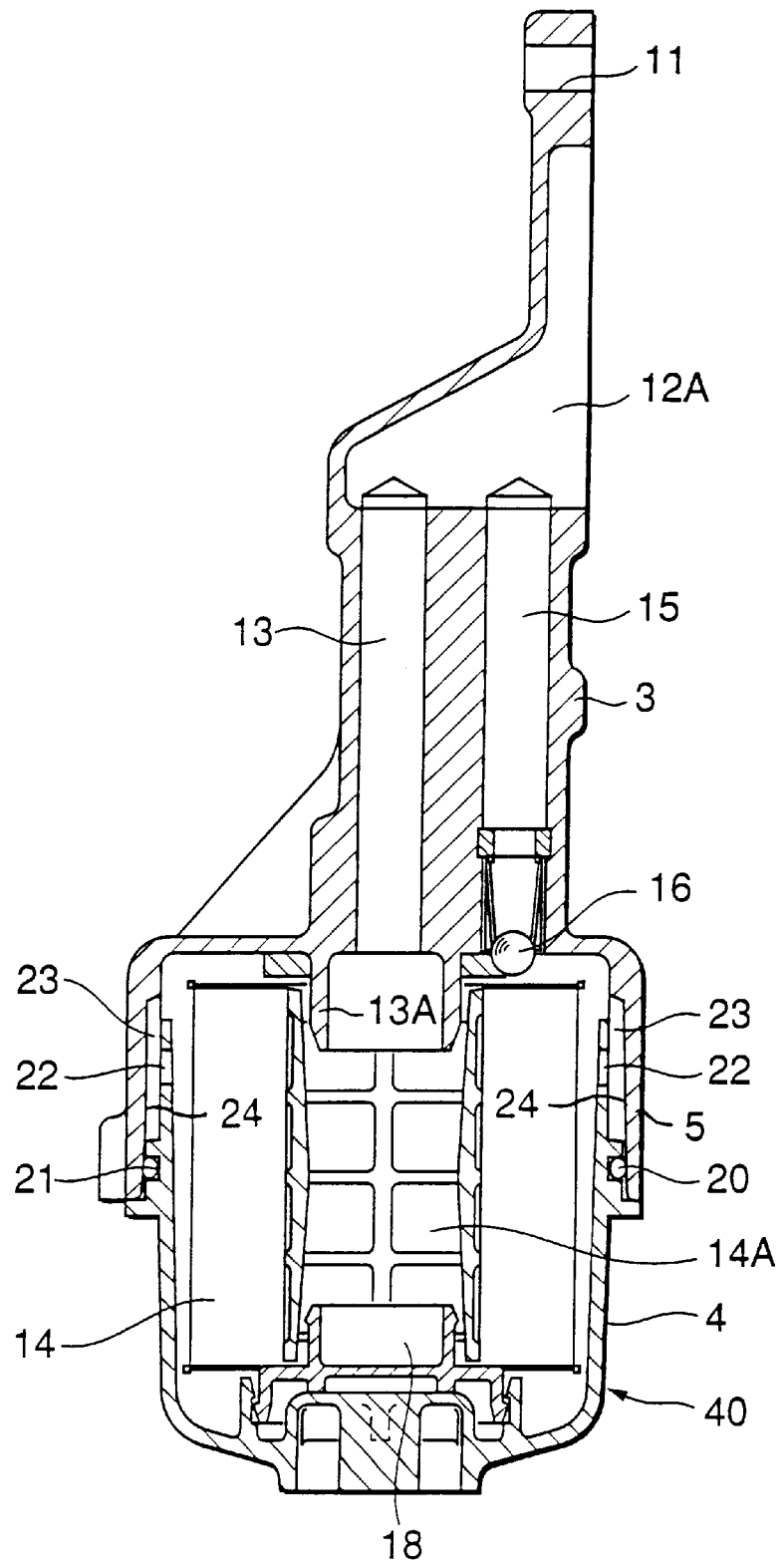
FIG. 9 is similar to FIG. 3, but showing a second embodiment of this invention.
Figure 10:
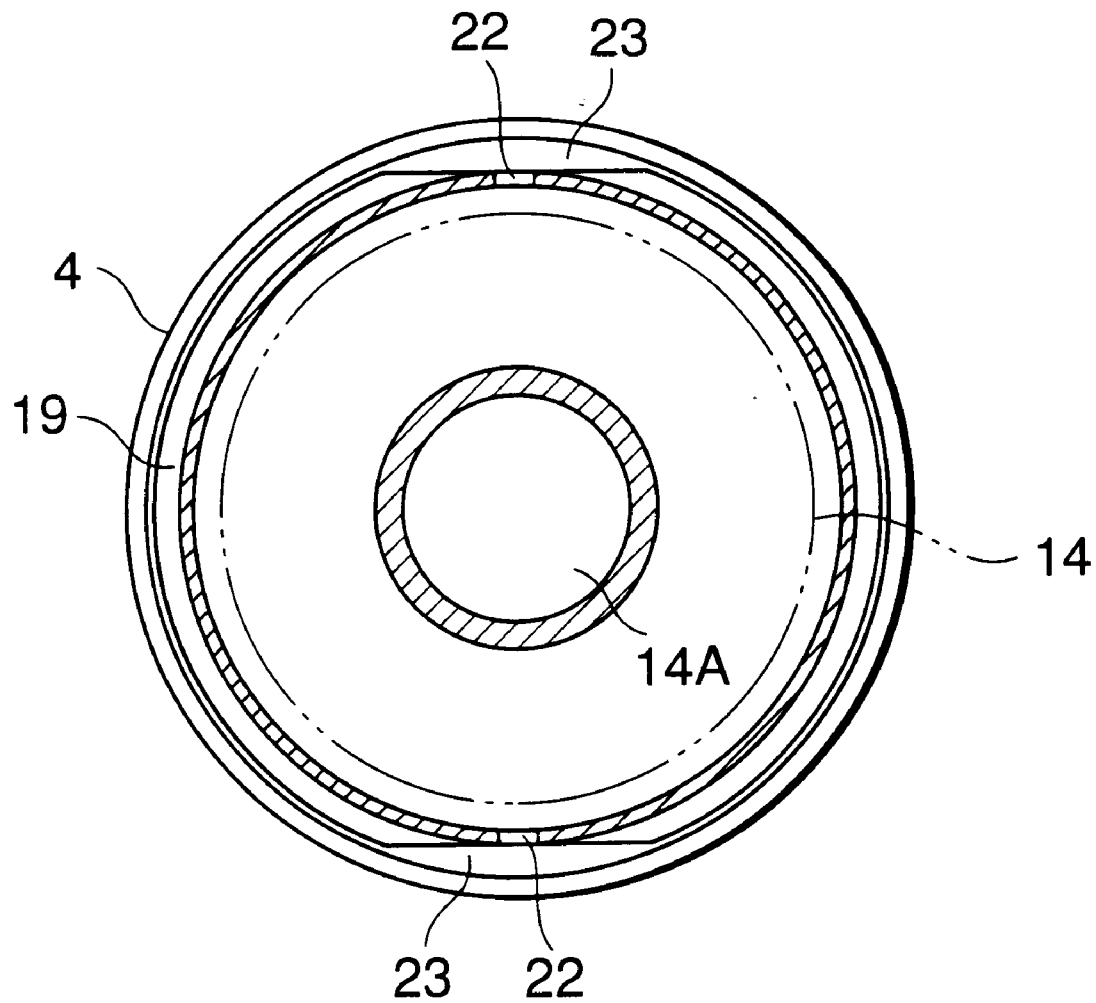
FIG. 10 is similar to FIG. 5, but showing the second embodiment of this invention.

Next, referring to FIGS. 9 and 10, a second embodiment of this invention will be explained.

According to this embodiment, two sets of the drain holes 22 and the second cut-outs 23 are provided on the outer circumference of the filter housing 4 at an interval of 180 degrees. Similarly, two cut-outs 24 are formed on the inner circumference of the holder 5 at the interval of 180 degrees.

In the case where the holder 5 and filter unit 40 are arranged vertically as in the aforesaid first embodiment, two drain passages are simultaneously formed in a predefined rotation position of the filter housing 4. In this case, therefore, the drainage of the lubrication oil will be accomplished earlier than in the case of the first embodiment.

In the case where the holder 5 and the filter unit 40 are arranged horizontally, it is preferable to dispose either of the cut-outs 24 at the lowest position in the holder 5. With this arrangement, an upper passage and a lower passage are simultaneously formed when the cut-outs 23 meet the cut-outs 24. When these passages are formed with the O-ring 20 detached from the holder 5, the lower passage drains the oil from the housing 4 while the upper passage provides air thereto. This air provided to the housing 4 boosts the drainage of the oil from the housing 4. In this case, the whole oil in the housing 4 is drained.

In the above embodiments, the filter housing 4 is provided with the drain hole 22. However, the drain hole 22 is not indispensable to this invention. Even if there are no drain holes, the first and second cut-outs 24, 23, when they meet together, drain a part or whole of the oil in the housing 4 at the predetermined position.

The contents of Tokugan Hei 10-39170, with a filing date of Feb. 20, 1998 and Tokugan Hei 10-369857, with a filing date of Dec. 25, 1998, respectively in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows:

What is claimed is:

1. A fixing structure of an engine oil filter unit, comprising:
   a bracket fixed to an engine, said bracket comprising a cylindrical part having an inner circumference, a female screw formed on said inner circumference and a first drain element formed in said female screw, and a housing which accommodates a filter element and is to be filled with oil, said housing having a cylindrical wall with an outer circumference, a male screw formed on said outer circumference to be engaged with said female screw, and a second drain element being formed in said male screw, wherein said first and second drain elements form a drain passage which drains oil in the housing to the outside when said first drain element meets said second drain element according to the relative rotation of said cylindrical part and said housing.

2. An engine oil filter unit fixing structure as defined in claim 1, wherein said structure further comprises a drain hole formed through the cylindrical wall for connecting said second drain element and inside of said housing.

3. An engine oil filter unit fixing structure as defined in claim 2, wherein said structure further comprises an O-ring fitted on said outer circumference, said O-ring being tightly fitted to said inner circumference in a position nearby said open end when said female and male screw are engaged with each other, and being detached from said inner circumference according to the relative rotation of said cylindrical part and said housing.

4. An engine oil filter unit fixing structure as defined in claim 1, wherein said cylindrical part has an open end, said first drain element comprises a first cut-out formed across the female screw towards said open end and said second drain element comprises a second cut-out formed across said male screw.

5. An engine oil filter unit fixing structure as defined in claim 1, wherein said structure further comprises a pair of marks which are formed on said cylindrical part and said housing for specifying a relative rotation position of said cylindrical part and said housing in which said first cut-out meets said second cut-out.

6. An engine oil filter unit fixing structure as defined in claim 5, wherein said cylindrical part has an outer circumference and either of said marks is formed on the outer circumference of said cylindrical part in a position corresponding to said first cut-out.

7. An engine oil filter unit fixing structure as defined in claim 1, wherein said cylindrical part has an open end, said first drain element comprises a plurality of first cut-outs formed across the female screw towards said open end at equal angular intervals, and said second drain element comprises second cut-outs the number of which is identical to the number of said first cut-outs, said second cut-outs being formed across the male screw at equal angular interval, said first cut-outs and said second cut-outs forming drain passages which drain oil in the housing to the outside when said first cut-outs meet said second cut-outs.

8. An engine oil filter unit fixing structure as defined in claim 7, wherein said structure further comprises drain holes formed through the cylindrical wall for connecting said second cut-outs and inside of said housing.

9. An engine oil filter unit fixing structure as defined in claim 8, wherein said first cut-outs, second cut-outs, and the drain holes are respectively disposed at an interval of 180 degrees.

* * * * *